(12) United States Patent
Seccardini et al.

(10) Patent No.: US 9,789,749 B2
(45) Date of Patent: Oct. 17, 2017

(54) AIR CONDITIONING SYSTEM FOR MOTOR-VEHICLES

(71) Applicant: C.R.F. Società Consortile per Azioni, Orbassano (Turin) (IT)

(72) Inventors: Riccardo Seccardini, Turin (IT); Walter Ferraris, Turin (IT)

(73) Assignee: C.R.F. Società Consortile per Azioni (IT)

( * ) Notice: Subject to any disclaimer, the term of this patent is extended or adjusted under 35 U.S.C. 154(b) by 304 days.

(21) Appl. No.: 14/807,201

(22) Filed: Jul. 23, 2015

(65) Prior Publication Data
US 2016/0023538 A1    Jan. 28, 2016

(30) Foreign Application Priority Data

Jul. 24, 2014 (EP) .................................... 14178279

(51) Int. Cl.
*B60H 1/32* (2006.01)
*B60H 1/00* (2006.01)
*F25B 41/06* (2006.01)

(52) U.S. Cl.
CPC ....... *B60H 1/3205* (2013.01); *B60H 1/00485* (2013.01); *B60H 1/323* (2013.01);
(Continued)

(58) Field of Classification Search
CPC ........... F25B 41/062; F25B 2341/0683; B60H 1/00485; B60H 2001/3291; B60H 1/3205; B60H 1/323
See application file for complete search history.

(56) References Cited

U.S. PATENT DOCUMENTS 5,724,817 A * 3/1998 Nishishita ............. F25B 39/022
62/216
5,732,570 A    3/1998 Tomatsu et al.
(Continued)

FOREIGN PATENT DOCUMENTS

EP    1265041 A2    12/2002
EP    1265041 B1     6/2006
(Continued)

OTHER PUBLICATIONS

European search report from corresponding EP application No. 14178279.7-1756, completed on Jan. 23, 2015 and dated Feb. 2, 2015.

*Primary Examiner* — Kun Kai Ma
(74) *Attorney, Agent, or Firm* — Heslin Rothenberg Farley & Mesiti, P.C.; Victor Cardona, Esq.

(57) ABSTRACT

An air conditioning system for motor-vehicles includes a thermally controlled expansion valve unit for regulating the expansion of the fluid upstream of the evaporator, depending upon the temperature downstream of the evaporator. An intermediate heat exchanger provides a heat exchange between the conduit upstream of the evaporator and the conduit downstream of the evaporator. The expansion valve unit is arranged in such a way that its temperature sensor detects a temperature of the fluid along the conduit downstream of the evaporator at a portion of this conduit which is located downstream also with respect to the intermediate heat exchanger. A connecting flange is interposed between the evaporator and the thermally controlled expansion valve unit.

1 Claim, 5 Drawing Sheets

(52) U.S. Cl.
CPC .... *F25B 41/062* (2013.01); *B60H 2001/3291* (2013.01); *F25B 2341/0683* (2013.01)

(56) References Cited

U.S. PATENT DOCUMENTS

| | | | | |
|---|---|---|---|---|
| 6,241,157 | B1* | 6/2001 | Yano | F25B 41/062 236/92 B |
| 6,615,608 | B1 | 9/2003 | Telesz et al. | |
| 2002/0194864 | A1* | 12/2002 | Hirota | F25B 41/062 62/498 |
| 2004/0163399 | A1* | 8/2004 | Kim | F25B 41/062 62/222 |
| 2004/0172958 | A1* | 9/2004 | Ito | F25B 40/00 62/222 |
| 2005/0223740 | A1* | 10/2005 | Ben Yahia | F25B 41/062 62/527 |
| 2008/0141691 | A1* | 6/2008 | Hirota | B60H 1/00571 62/190 |
| 2009/0288434 | A1* | 11/2009 | Lou | F25B 41/062 62/222 |
| 2010/0024453 | A1* | 2/2010 | Matsui | F25B 9/006 62/222 |
| 2010/0191381 | A1* | 7/2010 | Haussmann | B60H 1/00885 700/282 |
| 2011/0214755 | A1* | 9/2011 | Kesler | F16L 23/0283 137/468 |
| 2013/0042643 | A1* | 2/2013 | Haussmann | F25B 41/062 62/299 |
| 2013/0055752 | A1* | 3/2013 | Fleischhacker | F25B 40/00 62/498 |
| 2014/0265307 | A1* | 9/2014 | Dorland | B60H 1/00571 285/124.4 |
| 2016/0177974 | A1* | 6/2016 | Tanaka | F04F 5/46 417/151 |

FOREIGN PATENT DOCUMENTS

| | | | |
|---|---|---|---|
| JP | 2001174078 A | * | 6/2001 |
| JP | 2002213842 A | | 7/2002 |
| KR | 20020057158 A | * | 7/2002 |

\* cited by examiner

AIR CONDITIONING SYSTEM FOR MOTOR-VEHICLES

CROSS REFERENCE TO RELATED APPLICATIONS

This application claims priority to European Patent Application No. 14178279.7 filed on Jul. 24, 2014, the entire disclosure of which is incorporated herein by reference.

FIELD OF THE INVENTION

The present invention relates to air conditioning systems for motor-vehicles, of the type comprising a circuit for a fluid, said circuit including:
a compressor,
a condenser for receiving the fluid coming out of the compressor,
an expansion valve for receiving the fluid coming out of the condenser,
an evaporator for receiving the fluid expanded by said expansion valve, through a conduit located upstream of said evaporator and for directing the fluid again to said compressor, through a conduit located downstream of said evaporator,
wherein said expansion valve forms part of a thermally controlled expansion valve unit, wherein the expansion valve is controlled by a temperature sensor which detects the temperature of the fluid in the conduit downstream of the evaporator,
said circuit further including an intermediate heat exchanger for exchanging heat between said inlet conduit and said downstream conduit of the evaporator.

In air conditioning systems of the above indicated type, the thermally controlled expansion valve unit provides for a regulation of the expansion of the fluid as a function of the temperature at the outlet of the evaporator, so as to ensure that the fluid directed to the compressor is always in the gaseous state. However, the simultaneous adoption of a thermally controlled expansion valve unit and an intermediate heat exchanger poses a problem, because the temperature on which control of the expansion valve is based is detected downstream of the evaporator, but upstream of the intermediate heat exchanger; therefore, the expansion is controlled on the basis of a temperature which is subjected to a further variation in the intermediate heat exchanger, so that the state of the fluid at the inlet of the compressor cannot be controlled precisely.

Documents US 2013/055752 A1, JP 2002 213842 A, EP 1 265 041 A2 and U.S. Pat. No. 6,615,608 B1 disclose air conditioning systems wherein said thermally controlled expansion valve unit is arranged in such a way that said temperature sensor detects the temperature of the fluid along the conduit downstream of the evaporator, at an area of this conduit which is located also downstream of said intermediate heat exchanger, and wherein said thermally controlled expansion valve unit includes:
a housing,
a first path including said expansion valve and defined within said housing and interposed along said conduit upstream of the evaporator,
a second path, to which said temperature sensor is associated, said second path being defined within said housing and being interposed along said conduit downstream of the evaporator, along a portion of said downstream conduit which is located also downstream of said intermediate heat exchanger.

OBJECT OF THE INVENTION

The object of the present invention is that of providing an air conditioning system of the above indicated type in which the above mentioned drawback is overcome.

A further object of the present invention is that of providing an air conditioning system of the above indicated type which is simple and inexpensive.

A further object of the invention is that of enabling a conventional system to be modified into an air conditioning system according to the present invention by simple operations and by making use of inexpensive components.

SUMMARY OF THE INVENTION

In view of achieving these objects, the invention provides an air conditioning system of the above indicated type, wherein between said thermally controlled expansion valve unit and said evaporator there is interposed a connecting flange including a body through which a first passage, a second passage and a third passage are defined, and wherein:
said first passage is interposed along said conduit upstream of the evaporator, along a length between the expansion valve and the evaporator,
said second passage is interposed along said conduit downstream of the evaporator, along a length between said second path of the thermally controlled expansion valve unit and said compressor, and
said third passage is interposed along said conduit downstream of said evaporator, along a length between the evaporator and said intermediate heat exchanger, and wherein the thermally controlled expansion valve unit and said connecting flange are integrated with each other within a single unit having a single housing.

BRIEF DESCRIPTION OF THE FIGURES

Further features and advantages of the invention will become apparent from the description which follows with reference to the annexed drawings, given purely by way of non limiting example, in which.

DETAILED DESCRIPTION OF THE INVENTION

In FIGS. 1-5, the various components are shown merely in a diagrammatic manner, with no reference to actual dimensions and proportions of these components. In some cases, for greater clarity of illustration, the dimensions of some components have been exaggerated in proportion to dimensions of other components.

Figure 1:
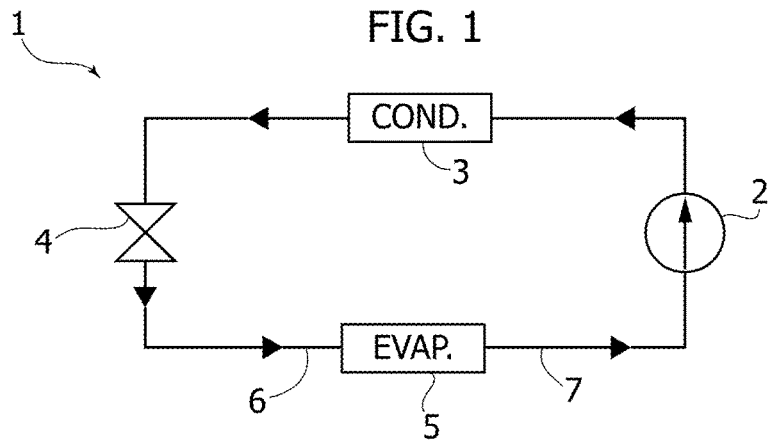
FIGS. 1-4 are diagrammatic views of air conditioning systems according to the prior art.

With reference to FIG. 1, numeral 1 designates an air conditioning system for motor-vehicles, of the conventional type comprising a circuit for a refrigerant fluid, including a compressor 2, a condenser 3, which receives fluid coming from the compressor 2, an expansion valve 4 which receives the fluid coming from the condenser 3, an evaporator 5 which receives fluid expanded by the expansion valve 4 and directs the fluid again to compressor 2. By reference numerals 6 and 7 there are designated the conduits upstream and downstream of the evaporator 5, respectively. In the remaining figures, parts in common with FIG. 1 are designated by the same references.

Figure 2:
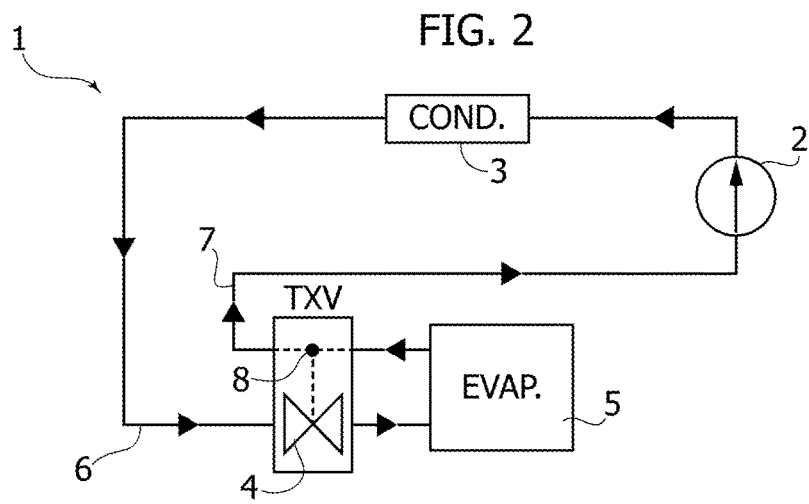

FIG. 2 shows a further solution of a known type, wherein the expansion valve 4 forms part of a single thermally controlled expansion valve unit TXV incorporating a temperature sensor 8 (shown only diagrammatically in the drawings) adapted to detect the temperature of the fluid in conduit 7 downstream of evaporator 5. The expansion valve unit TXV has a housing (also shown only diagrammatically) within which there are defined a first path including the expansion valve 4 and interposed along the conduit 6 upstream of the evaporator, and a second path, to which sensor 8 is associated, which is interposed along conduit 7 downstream of the evaporator.

Thermally controlled expansion valves (TXV) have been known and used since long. They include an element influenced by the temperature which mechanically controls the position of a movable needle provided within the expansion valve in order to adjust the passage cross-section for the fluid. A valve of this type is for example disclosed in document U.S. Pat. No. 5,732,570. Since the details of construction of the thermally controlled expansion valve unit can be made in any known way, and since these details, taken alone, do not form part of the present invention, they are not described herein nor illustrated, also because in this manner the drawings become simpler and easier to understand. This applies not only to the expansion valve, but also to the temperature sensor and the means connecting the sensor to the expansion valve.

Figure 3:
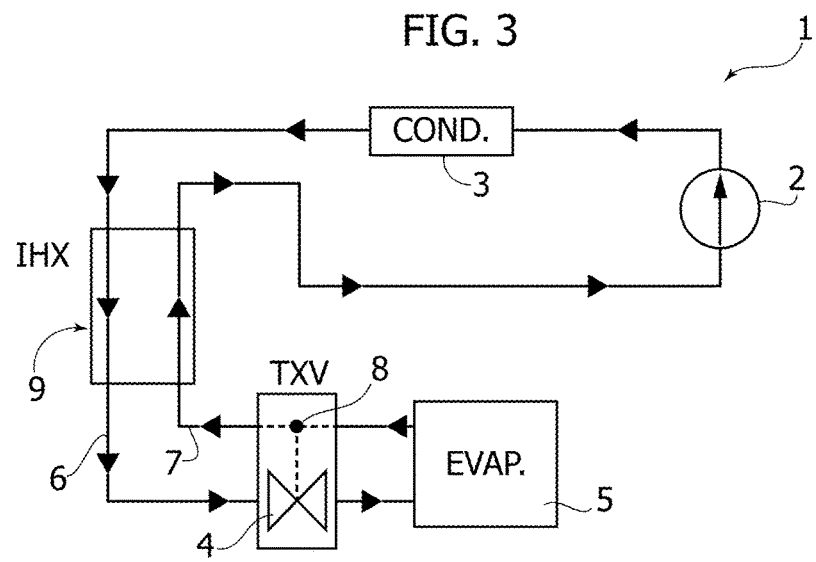

FIG. 3 shows a further known solution in which to the components of FIG. 2 there is added an intermediate heat exchanger (IHX) 9 which provides a heat exchange between conduit 6 upstream of the evaporator 5 and conduit 7 downstream of evaporator 5.

Figure 4:
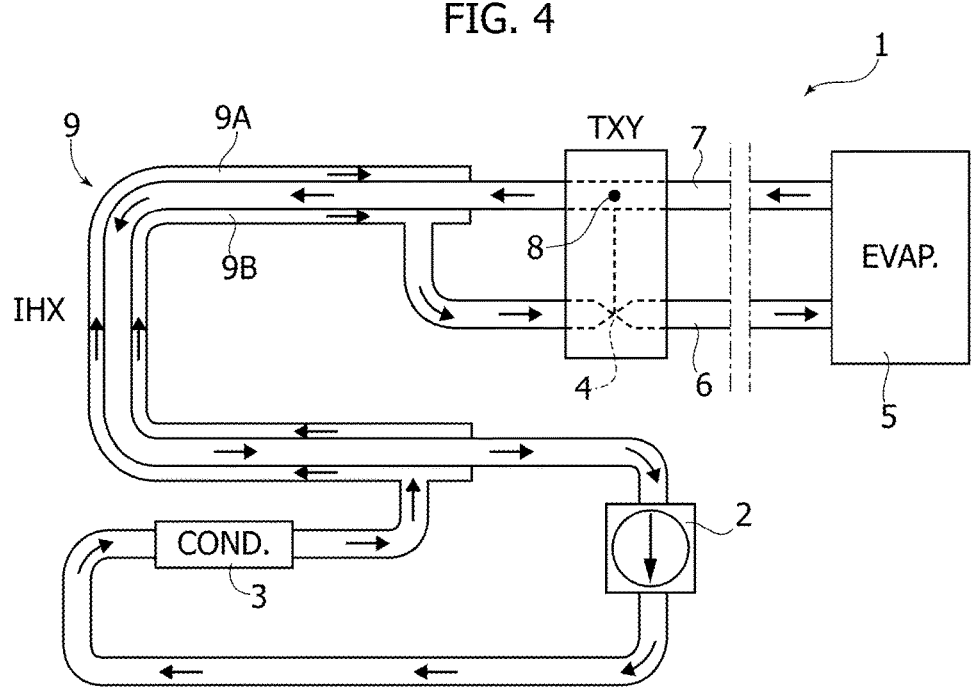

FIG. 4 shows a further diagram of a known air conditioning system of the type shown in FIG. 3, where the intermediate heat exchanger (IHX) 9 is constituted by a U-shaped arrangement of two coaxial tubes 9A, 9B through which the fluid along conduits 6,7 upstream and downstream of evaporator 5 flows in opposite directions.

With reference to FIG. 4, the fluid coming out of condenser 3 enters into the outer conduit 9A of the intermediate heat exchanger (IHX) 9 and advances along the entire U-shaped configuration, exchanging heat with the fluid which flows through the inner tube 9B, coming from the evaporator 5. The fluid coming from the condenser, once it has passed through the outer tube of the heat exchanger (IHX) 9 comes out therefrom and flows through the expansion valve 4 forming part of the thermally controlled expansion valve unit TXV. The fluid expanded through valve 4 reaches evaporator 5 (which is provided inside the motor-vehicle passenger compartment) and then returns to conduit 7 and through the second path of unit TXV, including the temperature sensor 8. Once it has passed through unit TXV, the fluid inside conduit 7 enters into the inner tube 9B of the intermediate heat exchanger (IHX) 9 and advances throughout its length, until it comes out therefrom and flows into compressor 2 from which the fluid returns to condenser 3.

As it is clearly apparent, the known system shown in FIG. 4 has the drawback that it does not insure the best control of the expansion through valve 4, since the temperature signal controlling the expansion valve 4 is taken at a spot 8 of conduit 7 which is upstream, with reference to the flow direction, with respect to the intermediate heat exchanger (IHX) 9. Therefore control of expansion valve 4 is carried out on the basis of a fluid temperature which is still subjected to changes before that the fluid reaches the compressor 2.

Figure 5:
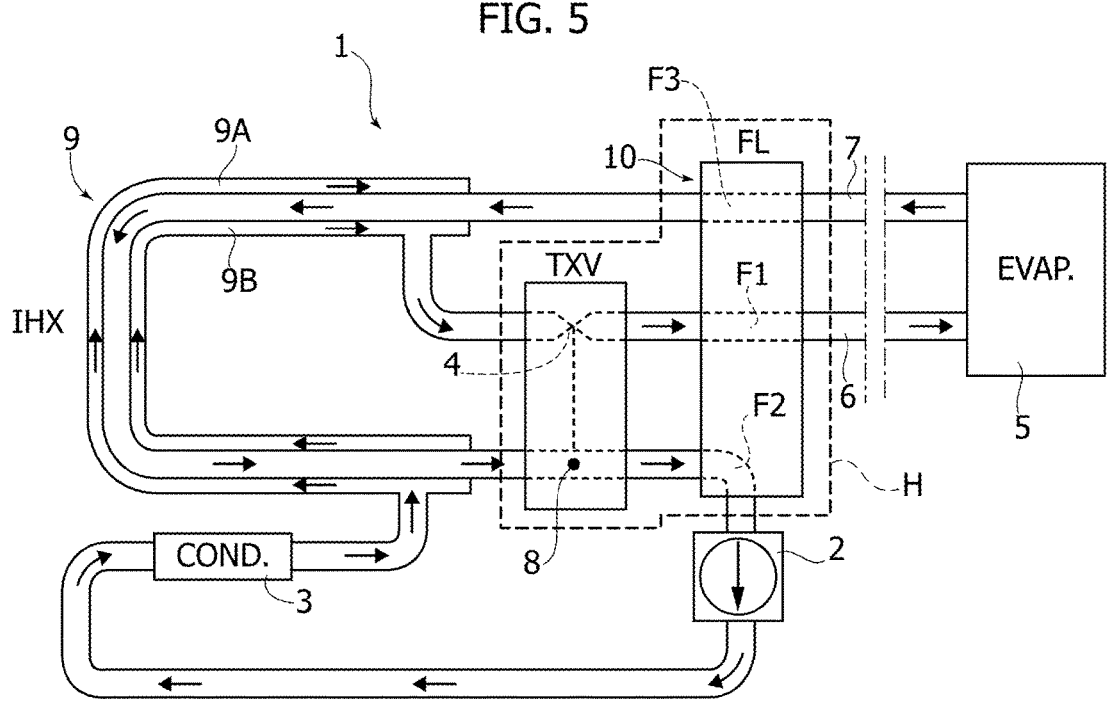
FIG. 5 is a diagram of an air conditioning unit according to the invention.

In order to overcome this drawback, the invention provides a system such as that according to the diagram shown in FIG. 5, where the thermally controlled expansion valve unit TXV has a different arrangement with respect to that of FIG. 4, since the first path, including the expansion valve 4, is also interposed along conduit 6 upstream of evaporator 5, whereas the second path, to which the temperature sensor 8 is associated, is interposed along a portion of conduit 7 which is downstream of the intermediate heat exchanger (IHX) 9.

Therefore, in the system according to the invention as shown in FIG. 5, the fluid coming out of compressor 2 reaches the condenser 3 and then enters into the outer tube 9A of the intermediate heat exchanger (IHX) 9. The fluid flows throughout the total length of the outer tube 9A and then comes out therefrom and flows into evaporator 5 passing through conduit 6 and the expansion valve 4. The fluid which has flown through evaporator 5 than returns through conduit 7 and enters into the inner tube 9B of the intermediate heat exchanger (IHX) 9. Once it has passed through the entire length of the inner tube 9B, the fluid comes out of the heat exchanger 9 and passes through the second path of unit TXV so that the temperature sensor 8 provided within this unit detects the temperature in conduit 7 downstream of the heat exchanger 9. After that it has passed through unit TXV, the fluid flowing through conduit 7 is directed again towards compressor 2.

It is to be noted that unit TXV can be absolutely identical to that provided in the known system of FIG. 4 and that simply it must be mounted in a different position, with its second path interposed along a length of conduit 7 which is downstream of the heat exchanger 9.

Figure 6:
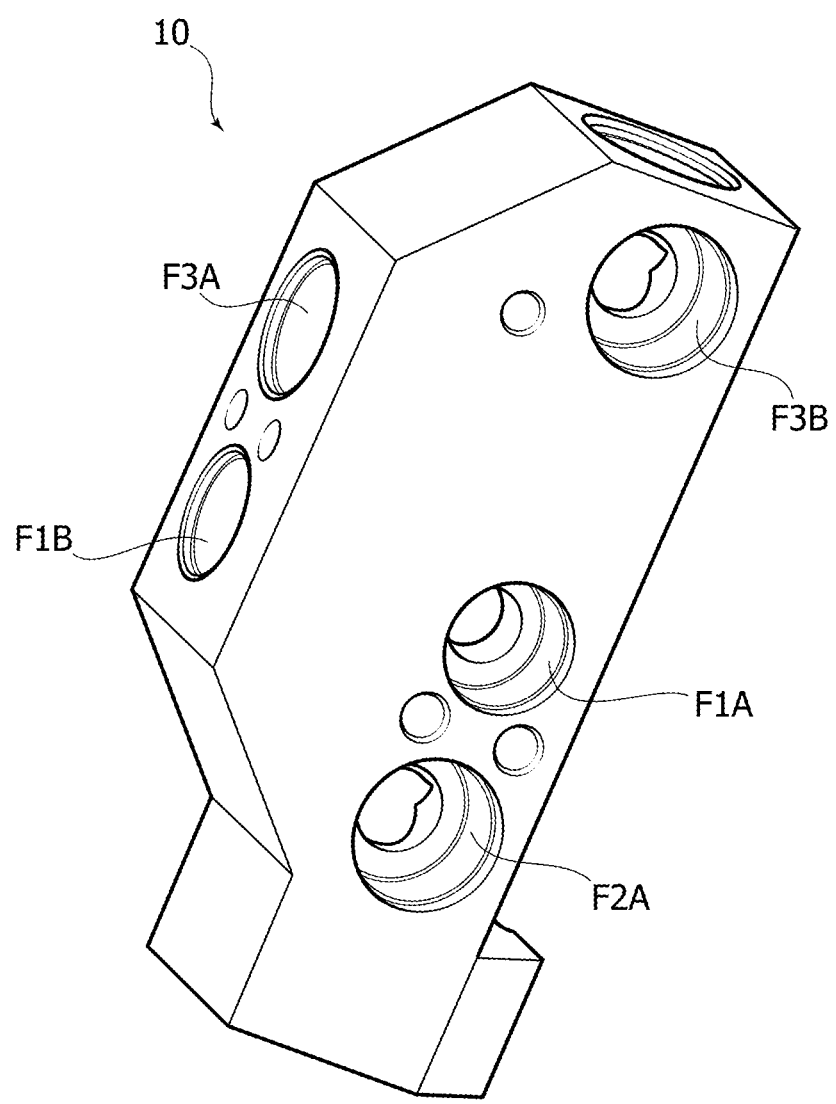
FIG. 6 is an actual embodiment of the connecting flange used in the embodiment of the system according to the invention which is shown in FIG. 5, and
FIGS. 7, 8 show cross-sectional views of the component of FIG. 6, respectively according to line VII of FIG. 8 and along line VIII of FIG. 7, respectively.
Figure 7:
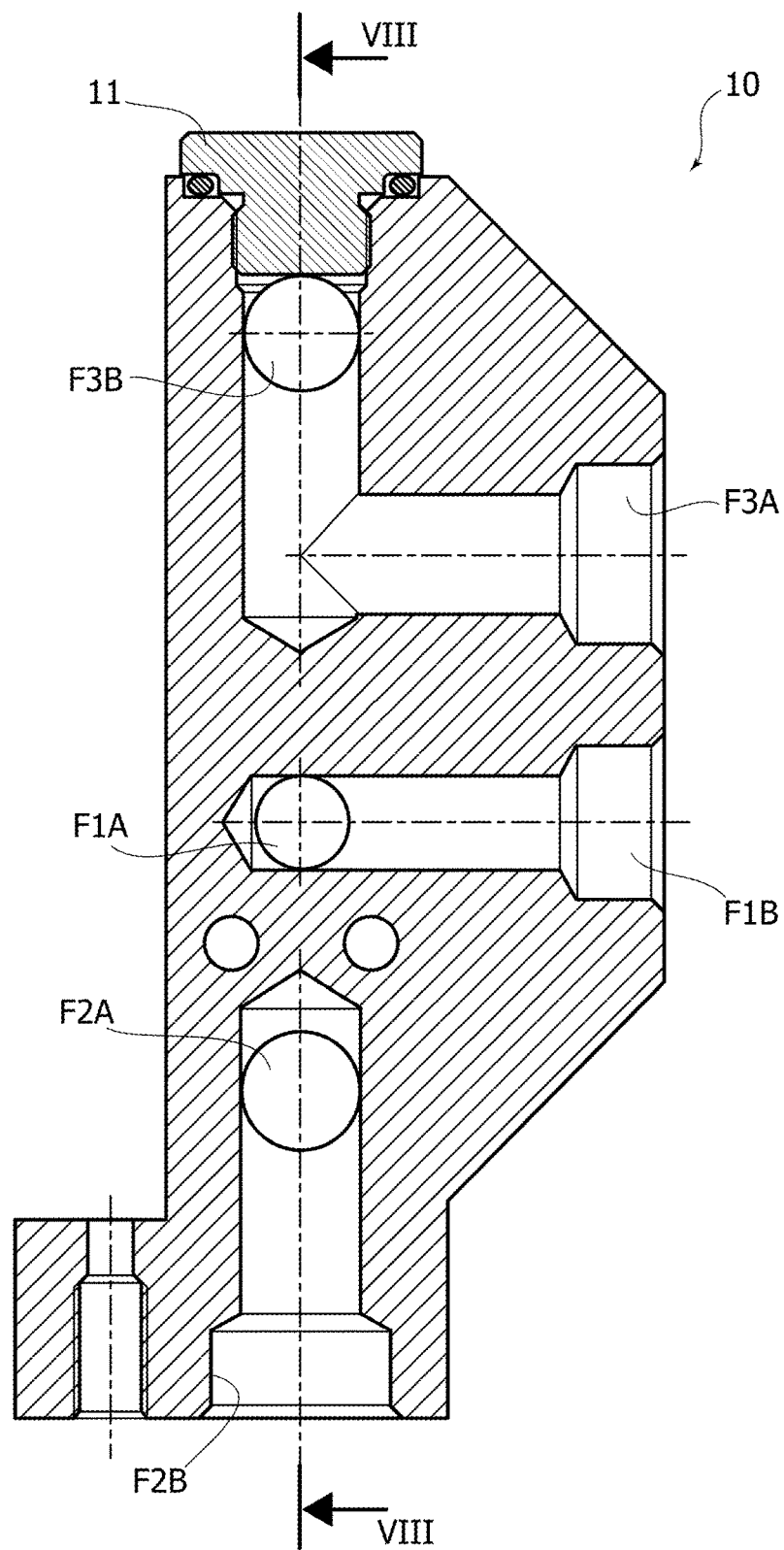
Figure 8:
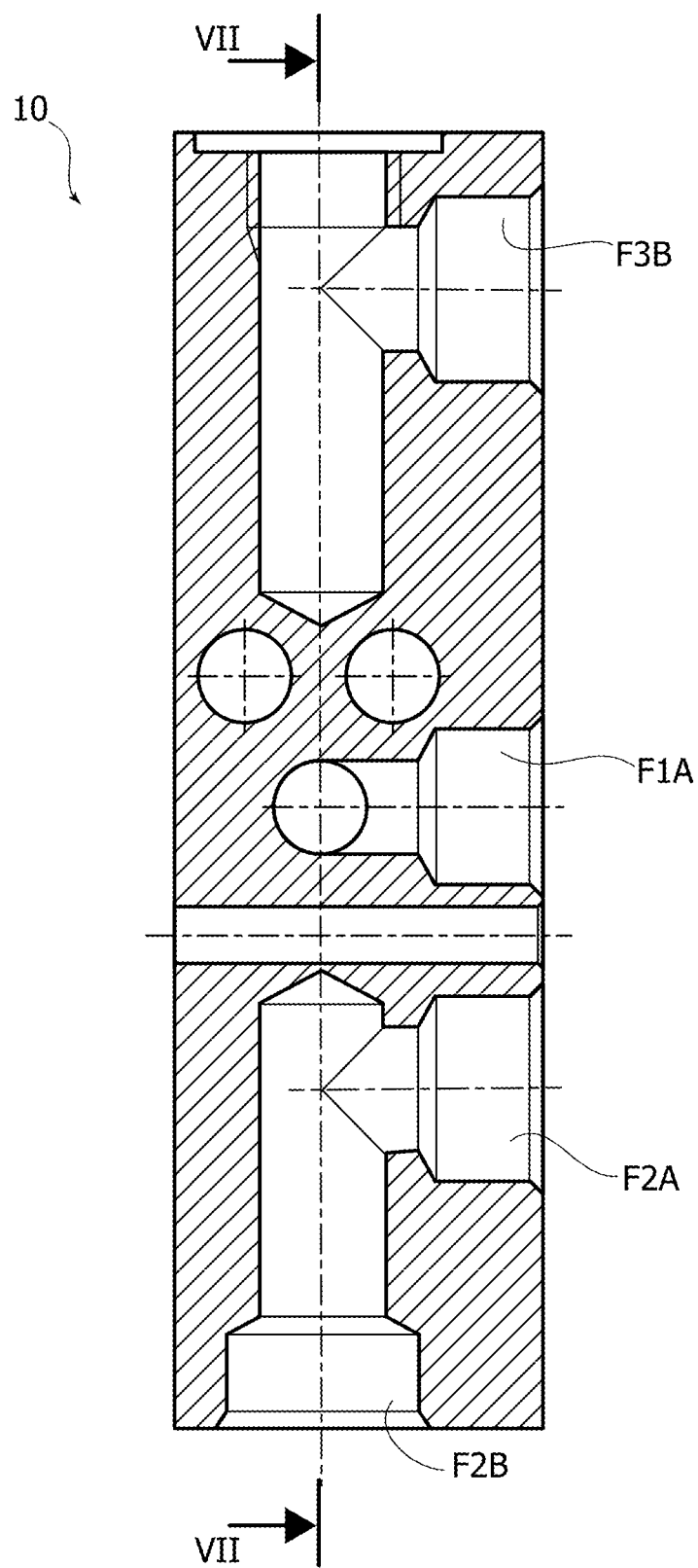

Again with reference to FIG. 5 and also to FIGS. 6-8, in order to facilitate the modification of a conventional system into an air conditioning system according to the invention, between the evaporator 5 and the thermally controlled expansion valve unit TXV, there is interposed a connecting flange (FL) 10 constituted by a metal body through which a first passage F1, a second passage F2 and a third passage F3 are formed. With reference to FIGS. 6-8, which show an exemplary embodiment of flange 10, first passage F1 extends from an inlet F1A to an outlet F1B. The second passage F2 extends from an inlet F2A to an outlet F2B and the third passage F3 extends from an inlet F3A to an outlet F3B.

As visible in FIG. 5, the first passage F1 is interposed along a length of conduit 6 which goes from the first path of unit TXV to the inlet of evaporator 5. The second passage F2 is interposed along a length of conduit 9 which goes from the second path of unit TXV to the inlet of compressor 2. Finally, the third passage F3 is interposed along a length of conduit 7 which goes from the outlet of evaporator to the inlet of the intermediate heat exchanger 9.

As clearly visible in FIGS. 6-8, the exemplary embodiment of the connecting flange 10 which is shown therein is constituted by a metal body, for example made off aluminium, provided with intercommunicating drilled holes adapted to define the above mentioned passages F1, F2, F3.

One of the drilled holes is closed by a closing plug 11 since it has only the function of enabling working of this piece. Each of the above mentioned inlets and each of the above mentioned outlets has a threaded surface portion for engagement of connecting elements (not shown) adapted to enabling connection to respective conduits.

The provision of the connecting flange 10 enables a conventional system of the type shown in FIG. 4 to be transformed into the system according to the invention, simply by modifying the arrangement of the thermally controlled expansion valve unit TXV, i.e. by interposing the second path of unit TXV along the length of conduit 7 which is downstream of the heat exchanger 9, as shown in FIG. 5, rather than along the length of conduit 7 upstream of the heat exchanger 9, as in FIG. 4. The provision of flange 10 enables the arrangement of the remaining components of the system and their connections to be kept substantially unaltered.

As already indicated in the foregoing, in the invention it is provided that the thermally controlled expansion valve unit TXV and said connecting flange 10 are integrated with each other within a single unit having a single housing.

Naturally, while the principle of the invention remains the same, the details of construction and the embodiments may widely varying with respect to what has been described and shown purely by way of example, without departing from the scope of the present invention.

What is claimed is:

1. Air conditioning system for motor-vehicles, comprising a circuit for a fluid, said circuit including:
   a compressor,
   a condenser for receiving a fluid coming out of the compressor,
   an expansion valve for receiving the fluid coming out of the condenser,
   an evaporator for receiving the fluid expanded by said expansion valve, through an upstream conduit upstream of said evaporator, and for directing the fluid to said compressor, through a downstream conduit downstream of said evaporator,
   wherein said expansion valve forms part of a thermally controlled expansion valve unit, wherein the expansion valve is controlled by a temperature sensor which detects a temperature of the fluid in the conduit downstream of the evaporator,
   an intermediate heat exchanger for providing a heat exchange between said upstream conduit and said downstream conduit,
   wherein said expansion valve unit is arranged in such a way that said temperature sensor detects the temperature of the fluid along the downstream conduit, at a position along said downstream conduit which is located downstream with respect to said intermediate heat exchanger,
   wherein said expansion valve includes:
   a housing,
   a first path including said expansion valve defined within said housing and interposed along said upstream conduit,
   a second path, to which said temperature sensor is associated, said second path being defined within said housing and being interposed along said downstream conduit, along a length of said downstream conduit which is located downstream with respect to said intermediate heat exchanger,
   a second connect flange between said expansion valve unit and said evaporator, said connecting flange including a body through which a first passage, a second passage and a third passage are defined, wherein:
   said first passage interposed along said upstream conduit, along a length between the expansion valve and the evaporator,
   said second passage interposed along said downstream conduit of the evaporator, along a length between said second path of the expansion valve unit and said compressor, and
   said third passage interposed along said downstream conduit of said evaporator, along a length between the evaporator and said intermediate heat exchanger, and
   said thermally controlled expansion valve unit and said connecting flange FL integrated with each other within a single unit having a single housing.

* * * * *

UNITED STATES PATENT AND TRADEMARK OFFICE
CERTIFICATE OF CORRECTION

PATENT NO. : 9,789,749 B2  
APPLICATION NO. : 14/807201  
DATED : October 17, 2017  
INVENTOR(S) : Seccardini et al.

Page 1 of 1

It is certified that error appears in the above-identified patent and that said Letters Patent is hereby corrected as shown below:

Column 5, Line 28: Claim 1, Delete "Air Conditioning" and insert -- An air conditioning --

Column 6, Line 7: Claim 1, Delete "unit"

Column 6, Line 13: Claim 1, Delete "wherein said expansion value includes:" and insert -- wherein said thermally controlled value unit includes --

Column 6, Line 24: Claim 1, Delete "a second connect flange between" and insert -- a connecting flange between --

Column 6, Line 25: Claim 1, Delete "unit"

Column 6, Line 33: Claim 1, Delete "unit"

Column 6, Line 39: Claim 1, Delete "FL"

Signed and Sealed this  
Twelfth Day of December, 2017

Joseph Matal  
*Performing the Functions and Duties of the*  
*Under Secretary of Commerce for Intellectual Property and*  
*Director of the United States Patent and Trademark Office*